(12) United States Patent
Von Huben et al.

(10) Patent No.: US 9,338,130 B2
(45) Date of Patent: May 10, 2016

(54) APPARATUS AND METHOD TO REGISTER WI-FI CLIENTS ON A WI-FI NETWORK

(71) Applicant: Broadcom Corporation, Irvine, CA (US)

(72) Inventors: Nicholas Oliver Von Huben, Bexley North (AU); Jason Robert Crawford, St Ives (AU)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/039,708

(22) Filed: Sep. 27, 2013

(65) Prior Publication Data

US 2014/0226817 A1 Aug. 14, 2014

Related U.S. Application Data

(60) Provisional application No. 61/763,299, filed on Feb. 11, 2013.

(51) Int. Cl.
| | | |
|---|---|---|
| *H04L 29/06* | (2006.01) | |
| *H04L 29/12* | (2006.01) | |
| *H04W 12/04* | (2009.01) | |
| *H04W 12/08* | (2009.01) | |
| *H04L 12/24* | (2006.01) | |
| *H04W 12/02* | (2009.01) | |
| *H04W 84/12* | (2009.01) | |
| *H04W 4/00* | (2009.01) | |
| *H04W 8/20* | (2009.01) | |

(52) U.S. Cl.
CPC .............. *H04L 61/35* (2013.01); *H04W 12/04* (2013.01); *H04L 41/0803* (2013.01); *H04L 63/0435* (2013.01); *H04W 4/005* (2013.01); *H04W 8/20* (2013.01); *H04W 12/02* (2013.01); *H04W 12/08* (2013.01); *H04W 84/12* (2013.01)

(58) Field of Classification Search
USPC .......................................... 380/270
See application file for complete search history.

(56) References Cited

U.S. PATENT DOCUMENTS

| | | | | |
|---|---|---|---|---|
| 7,848,362 | B2 * | 12/2010 | Picard | 370/350 |
| 8,281,392 | B2 * | 10/2012 | Sinha et al. | 726/22 |
| 8,429,729 | B1 * | 4/2013 | Chhabra | 726/7 |
| 8,767,757 | B1 * | 7/2014 | Chudgar | H04L 45/745 370/256 |
| 2004/0229606 | A1 * | 11/2004 | Oshima et al. | 455/426.2 |
| 2005/0025080 | A1 * | 2/2005 | Liu | H04W 52/0229 370/311 |
| 2006/0153156 | A1 * | 7/2006 | Wentink et al. | 370/338 |

(Continued)

*Primary Examiner* — Mahfuzur Rahman
(74) *Attorney, Agent, or Firm* — Sterne, Kessler, Goldstein & Fox P.L.L.C.

(57) ABSTRACT

Techniques are provided to enable the registration of an embedded device with a wireless network, such as a Wi-Fi network. An established client of the wireless network formulates one or more data packets having an unencrypted multicast address, where at least a portion of the multicast address is unnecessary for transmission of the data packets over the wireless network. The established client inserts network configuration information in the unused portion of the multicast address and transmits the data packets over wireless network. The network configuration information can include a network identification (SSID) and network password. Any access point that receives the multicast packets will retransmit multiple times per standard protocol, allowing the embedded device to receive the original transmission from the client device or the retransmissions. Since the address portion of data packets are not encrypted, the embedded device can determine the SSID and any password from the multicast packets, and thereafter register with the wireless network.

18 Claims, 8 Drawing Sheets

(56) References Cited

U.S. PATENT DOCUMENTS

| | | | |
|---|---|---|---|
| 2008/0028211 A1* | 1/2008 | Tanizawa | H04L 63/065 713/163 |
| 2008/0084833 A1* | 4/2008 | Picard | G01D 4/004 370/280 |
| 2008/0204248 A1* | 8/2008 | Cam Winget et al. | 340/572.4 |
| 2009/0092076 A1* | 4/2009 | Zheng | H04W 28/06 370/328 |
| 2013/0128809 A1* | 5/2013 | Wentink | H04L 29/0604 370/328 |

* cited by examiner

APPARATUS AND METHOD TO REGISTER WI-FI CLIENTS ON A WI-FI NETWORK

CROSS REFERENCE TO RELATED APPLICATIONS

The present application claims the benefit of U.S. Provisional Application No. 61/763,299, filed Feb. 11, 2013, which is incorporated herein by reference in its entirety.

FIELD

Certain embodiments of the disclosure relate generally to access to a communication network.

BACKGROUND

Wireless communication devices generally require specific setup and configuration information to access a wireless network and connect to clients of the wireless network. A wireless network may broadcast its setup and configuration information to allow wireless communication devices within its range to access the wireless network.

For example, wireless communication devices seeking access to a Wi-Fi network may need the network's service set identification (SSID) to access the network. The Wi-Fi network may broadcast its SSID from its wireless access point to allow potential users to access the network.

If a high level of security is needed, however, a wireless network may not broadcast its setup and configuration information. Furthermore, the wireless network may require an access password to access the network or data encryption to protect data communications. For example, a workplace may use a Wi-Fi network to interconnect work stations and servers, which may exchange business-sensitive or confidential information. In such an environment, the Wi-Fi network's SSID and/or any additional setup and configuration information (e.g., a password, encryption information, etc.) may need to be entered into each workstation through a user interface.

For wireless communication devices that include a regular user interface, such as tablets, laptops, phones, etc., entering setup and configuration information for accessing a secure wireless network may be relatively easy (e.g., via a keyboard, display, touchscreen, storage media, etc.). However, for embedded wireless communication devices having a limited user interface, such as home appliances (e.g., washer, dryer, dishwasher, oven, small kitchen appliances, etc.), control systems (e.g., thermostat, garage door, home security, etc.), and sensors (e.g., temperature sensors, plant moisture sensors, body weight scales, etc.), it may be difficult, time-consuming, or inconvenient to enter a network's setup and configuration information.

BRIEF DESCRIPTION OF THE DRAWINGS

Exemplary embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
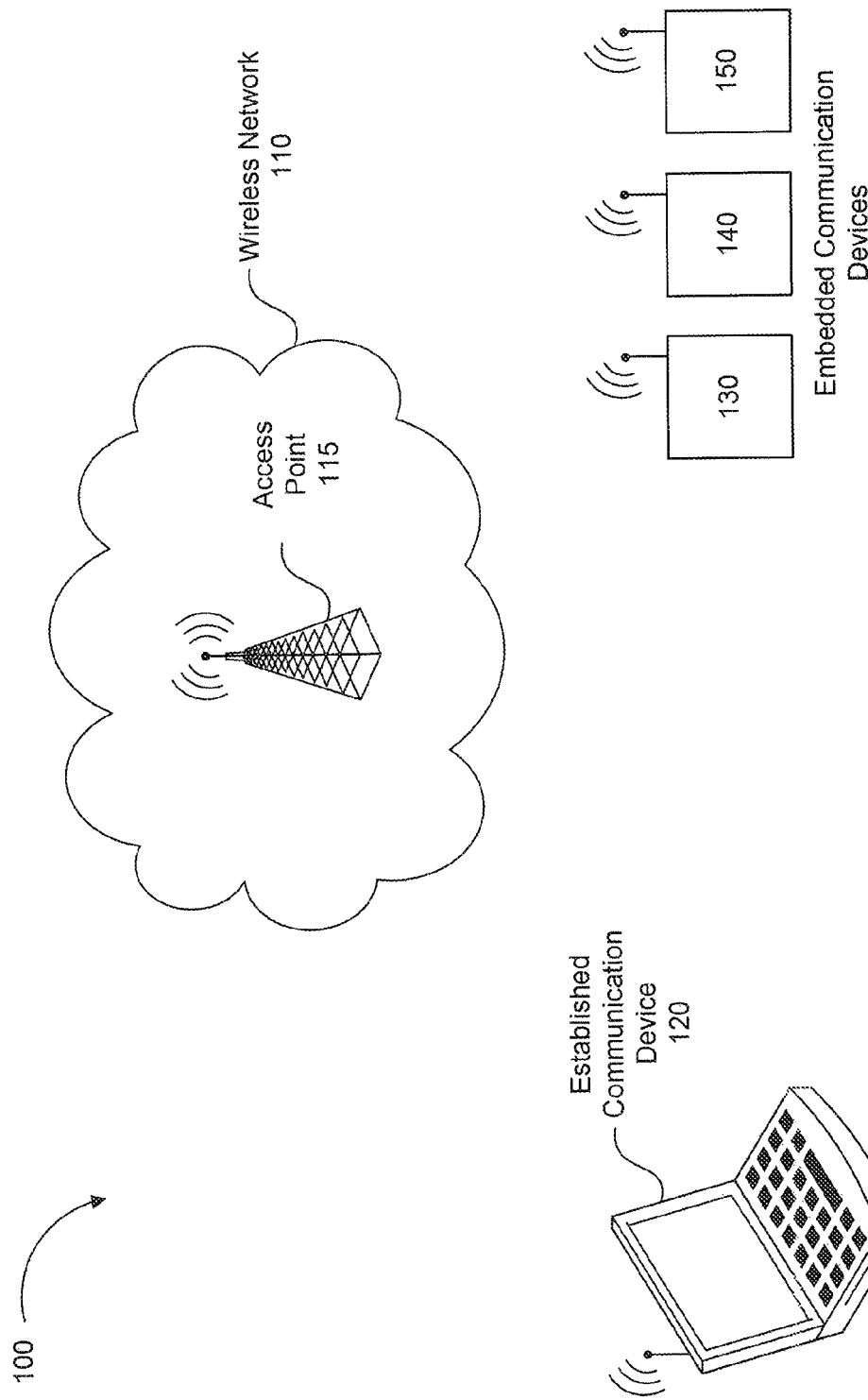
FIG. 1 is a diagram of an environment for providing setup and configuration information to a device according to an exemplary embodiment.

The following Detailed Description refers to accompanying drawings to illustrate various exemplary embodiments. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases arc not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The various exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

The present disclosure describes methods to enable a device connected to a wireless network (i.e., established communication device), such as a phone, tablet, and laptop, having a regular user interface (e.g., keyboard, display, touchscreen, etc.), to transfer wireless network setup and configuration information to one or more devices that are not connected to the wireless network and have a limited user interface (i.e., unestablished embedded communication devices). In an exemplary embodiment, an established Wi-Fi network client may use portions of Wi-Fi packets to provide setup and configuration information, such as the Wi-Fi network's SSID and password, to an unestablished embedded wireless communication device.

Furthermore, embedded communication devices may have limited processing power and/or memory to run process-intensive applications such as a mobile Domain Name Service (mDNS), used for finding services and other network clients. Thus, depending on the processing power and/or memory of the embedded communication device, it may be difficult for the device to establish communication with other network clients. In an exemplary embodiment, an established Wi-Fi network client may use portions of Wi-Fi packets to provide its Internet Protocol (IP) address, or that of other Wi-Fi network clients, to an embedded communication device to allow the device to establish communication with other Wi-Fi network clients.

FIG. 1 is a diagram of an environment 100 for providing setup and configuration information for accessing a wireless network to an unestablished embedded wireless communication device according to various embodiments of the present disclosure. Environment 100 includes a wireless network 110, an access point 115 for accessing wireless network 110, an established communication device 120, and embedded communication devices 130-150.

Wireless network 110 may include a Wi-Fi network, and thus, access point 115 may include a Wi-Fi network access point. Those of ordinary skill in the art would understand that wireless network 110 may include other type of wireless network, such as a Zigbee network, a Bluetooth network, etc. Furthermore, those of ordinary skill in the art would understand that the Wi-Fi network may be of a type that uses a 2.4 GHz band or a 5 GHz band without departing from the scope of the present disclosure.

Established communication device 120 comprises suitable circuitry, logic, and/or code to access wireless network 110 and a regular user interface, which in one embodiment of the present disclosure can refer to an interface that allows a user to manually enter information for accessing wireless network 110. A regular user interface may include, for example, a keyboard/keypad, a display, a touchscreen display, that allows the user to easily enter alphanumerical characters. Established communication device 120 may be embodied in a laptop computer. Those of ordinary skill in the art would understand that established communication device 120 may be embodied in a phone, tablet, or some other device having a regular user interface and being capable of connecting to wireless network 110. For purposes of the discussion that follows, and not as a limitation, established communication device 120 has been configured to communicate with access point 115 and access wireless network 110. Accordingly, established communication device 120 has the necessary setup and configuration information necessary to access wireless network 110, including an SSID and/or password that might be necessary to access the wireless network 110.

Embedded communication devices 130-150 comprise suitable circuitry, logic, and/or code to access wireless network 110 and a limited user interface, which in one embodiment of the present disclosure refers to an interface that does not enable a user to directly enter information for accessing wireless network 110. A limited interface may include an interface including a switch, a dial, a push-button, or a similarly featured element providing limited or no access to enter alphanumeric characters. Embedded communication device 120 may include home appliances (e.g., washer, dryer, dishwasher, oven, small kitchen appliances, etc.), control systems (e.g., thermostat, garage door, home security, etc.), and sensors (e.g., temperature sensors, plant moisture sensors, body weight scales, etc.). Those of ordinary skill in the art would understand that the present disclosure is not limited to providing setup and configuration information to devices having a limited user interface. Unestablished devices having suitable circuitry, logic, and/or code to access wireless network 110 and a regular user interface may also be setup/configured according to the teachings of the present disclosure.

Figure 2:
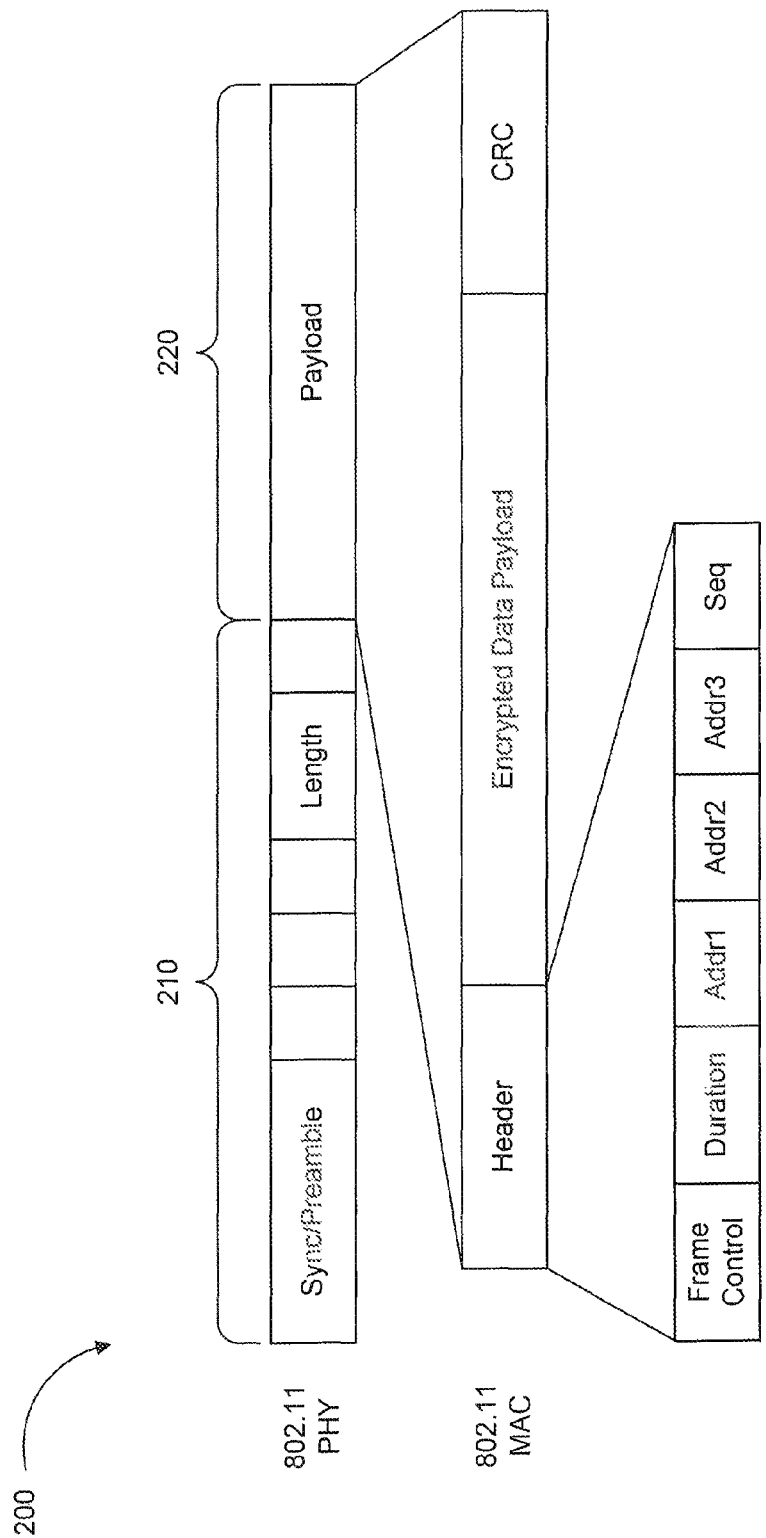
FIG. 2 is a diagram of a Wi-Fi packet to illustrate aspects of the present disclosure.

FIG. 2 shows the format of a Wi-Fi (IEEE 802.11 Standard) physical layer (PHY) packet. The PHY packet includes a PHY header 210 and a payload 220. For security purposes, the data section of a Wi-Fi packet's payload is encrypted using one of various Wi-Fi security methods. However, the header section of the Wi-Fi packet, and the header section of the Wi-Fi packet's payload are not encrypted, and thus, can be decoded by devices configured to receive and decode the Wi-Fi packet. The header section contains various fields for information such as packet type, source and destination addresses of the packet, packet length, packet sequence number, etc. In various exemplary embodiments of the present disclosure, these fields are used to send network setup and configuration information from established communication devices to unestablished embedded wireless communication devices.

Returning to FIG. 1, established communication device 120 is connected to wireless network 110 through access point 115. Accordingly, established communication device 120 already has setup and configuration information for accessing wireless network 110, such as the network's SSID and password. To provide this information to an unestablished communication device, such as embedded communication device 130, established communication device 120 configures and sends multicast packets including the setup and configuration information in the packet's unencrypted sections (e.g., header section of the packet's payload). Because multicast packets can be read and decoded by any device configured to communicate with wireless network 110, embedded communication device 130 can read and decode the multicast packet, and thus, receive the setup and configuration information to access wireless network 110 through wireless means instead of through a user interface. Multicast packets utilize a pre-determined address that triggers re-broadcast by any AP that receives a broadcast packet. Therefore, even if the established communication device lacks the signal power to reach one or more of the embedded communications device, an AP that receives the multicast packet will rebroadcast a predetermined number of times.

Established communication device 120 may also configure the multicast packet to include its IP address, or that of other Wi-Fi network client, to allow embedded communication device 130 to communicate with itself (device 120) and other Wi-Fi network clients without the need to access a Domain Name Server (DNS) to do so. Accordingly, embedded communication device 130 may not need to include processing capabilities to generate and process a DNS query.

Therefore, in the present exemplary embodiment, an established device provides setup and configuration information for accessing a wireless network to an unestablished device having limited user interface through the wireless network instead of through the unestablished device's limited user interface. A person or ordinary skill in the art would understand that exemplary embodiments according to the present disclosure may be used to setup and configure multiple unestablished embedded communication devices simultaneously, or unestablished devices having a regular user interface, without departing from the scope of the present disclosure. Furthermore, although in the present exemplary embodiment the headers are transmitted unencrypted, the present disclosure is not so limited, and established communication device 120 may encrypt the setup and configuration information before including it in the multicast packet to prevent unauthorized users from listening to the multicast packet to obtain the information and access the network. In such an embodiment, the setup and configuration information may be encrypted using one of a variety of encryption methods such as the advanced encryption standard (AES).

Figure 3:
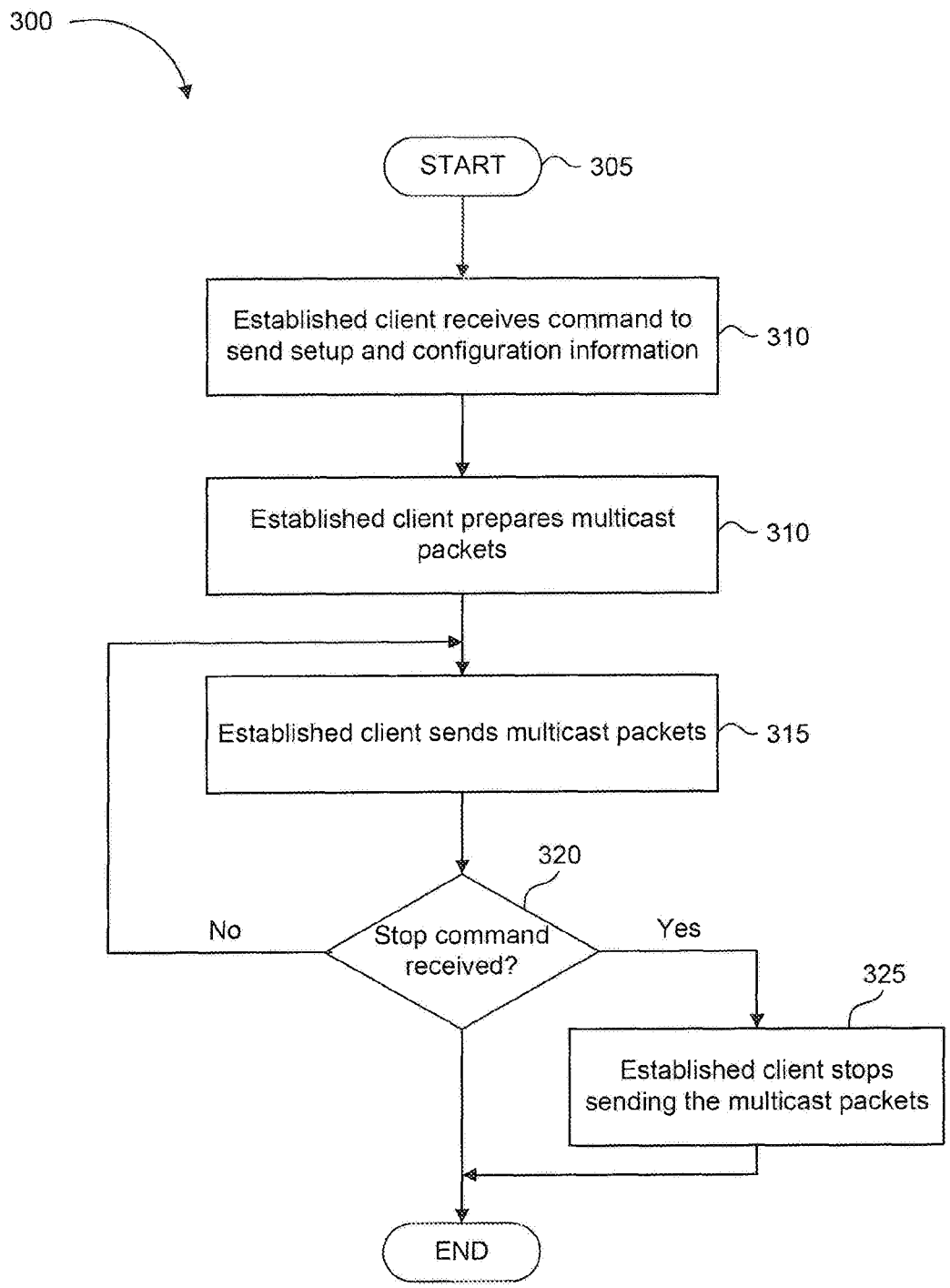
FIG. 3 is a flow diagram of a method for providing setup and configuration information to a device according to an exemplary embodiment.

FIG. 3 is a flow diagram 300 of a method for providing setup and configuration information from an established communication device to an embedded communication device, according to an exemplary embodiment of the present disclosure. The established communication device may be configured to perform the method described herein and other methods described throughout the disclosure by downloading and installing a Setup Application. The Setup Application configures the established communication device to receive, through a user interface, a command to perform the method described in flow diagram 300. For example, the Setup Application may provide the user an input screen to start sending a multicast packet including the setup and configuration information through a Wi-Fi network.

At step 305, an established communication device of a Wi-Fi network, such as established communication device 120 illustrated in FIG. 1, receives a command to send the setup and configuration information necessary to access the Wi-Fi network, such as wireless network 110 illustrated in FIG. 1, via multicast packet. At step 310, the established communication device prepares at least one multicast packet. As will be explained with further detail with respect to FIG. 6, each multicast packet may be configured to include a portion of the setup and configuration information necessary to access the Wi-Fi network. Accordingly, transmitting the setup and configuration information via multicast packets may require a plurality of multicast packets.

At step 315, the established communication device sends the at least one multicast packet that includes at least a portion of the setup and configuration information (e.g. SSID and password of the wireless network). At step 320, the established communication device determines whether to resend the at least one multicast packet based on whether a command to stop sending the at least one multicast packet has been received. In particular, a user trying to use the established communication device to provide the setup and configuration information to the embedded communication device may need to enable the embedded communication device to listen for setup and configuration information to access the Wi-Fi network in multicast packets by using the embedded communication device's limited user interface. For example, the embedded communication device may include a switch or a button to enable listening to and reading setup and configuration information from multicast packets. The user may wish to continue sending the setup and configuration information multicast packets until it is determined that the embedded communication device received the setup and configuration information and/or accessed the Wi-Fi network. For example, once registered, the embedded communications device may send a message to the established communications device indicating its registration with the wireless network is complete.

If a command to stop sending the at least one multicast packet has been received, the established client stops sending the multicast packets (step 325) and the process ends. If a command to stop sending the at least one multicast packet has not been received, the established client resends the at least one multicast packets. Those of ordinary skill in the art would understand that the established device may send the at least one multicast packet a configurable, predetermined, or indefinite number of times without departing from the scope of the present disclosure, and/or until evidence of the embedded device's registration with the wireless network.

Figure 4:
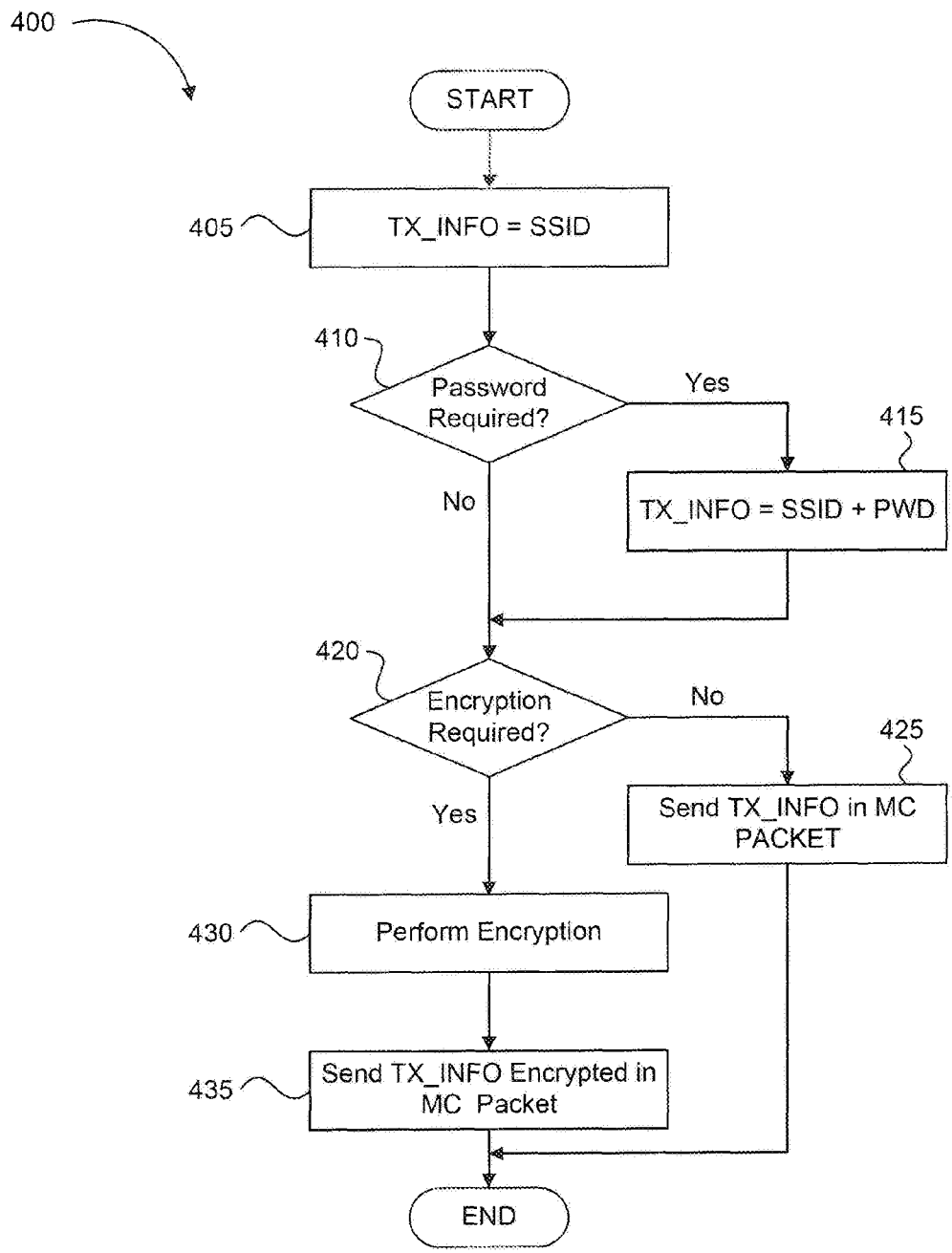
FIG. 4 is a flow diagram of a method for providing setup and configuration information to a device according to an exemplary embodiment.

FIG. 4 is a flow diagram 400 of a method for providing setup and configuration information to an embedded communication device, according to an exemplary embodiment of the present disclosure. The method may be performed by an established communication device, such as established communication device 120 illustrated in FIG. 1. The established communication device may be configured to perform the method described herein and other methods described throughout the disclosure by downloading and installing a Setup Application. The Setup Application configures the established communication device to receive, through a user interface, a command to perform the method described in flow diagram 400. For example, the Setup Application may provide the user an input screen to start sending a multicast packet including the setup and configuration information through a Wi-Fi network.

At step 405, an established client of a Wi-Fi network, such as established communication device 120 illustrated in FIG. 1, sets the Wi-Fi network's SSID as the information to be transmitted to an unestablished embedded communication device (TX_INFO), such as embedded communication device 130 illustrated in FIG. 1. Note that the established device is a client of the wireless network; therefore, it is aware of all of the information necessary to access the network, including the Wi-Fi network's SSID and any password.

At step 410. the established communication device determines if the Wi-Fi network is configured to require a password. This determination is based on its own configuration since, as noted above, the established communication device is aware of all of the information necessary to access the network. If a password is required, the established communication device sets TX_INFO to the SSID plus the password (step 415).

At step 420, the established communication device determines if TX_INFO needs to be encrypted. In general, whether TX_INFO is encrypted depends on the security needs of the environment since, without any encryption, any device configured to decode signals from the Wi-Fi network would be able to decode TX_INFO from the multicast packet and use the information to access the Wi-Fi network. Thus, this determination is based on the environment, and may be configured by the user in the established communication device. Note that this determination is independent of the setup and configuration to access the network, but instead, in the implementation for providing the setup and configuration to unestablished devices.

If TX_INFO does not need to be encrypted, the established communication device sends TX_INFO, unencrypted, in a multicast packet to the unestablished embedded communication device through the Wi-Fi network (step 425). If TX_INFO needs to be encrypted, the exemplary embodiment encrypts TX_INFO (step 430) and sends encrypted TX_INFO in a multicast packet to the unestablished embedded communication device through the Wi-Fi network (step 435). Since the Wi-Fi protocol does not require encryption for the section of the data packets in which TX_INFO will be included, the choice of encryption algorithm is not limited/bound by the Wi-Fi protocol. Accordingly, the encryption algorithm used can be tailored to the particular security needs of the environment.

It is noted that the unestablished communication device must be listening for multicast packets from the network and must be aware of the level of encryption, if any, being used by the established communication device to receive the setup and configuration information. The unestablished communication device may be pre-configured to be constantly listening to available networks, or may include a limited interface to enable a listening mode, without departing from the scope of the present disclosure. For example, the unestablished communication device may include a button or switch for user control to enable a listening mode for receive the setup information via the wireless network. Furthermore, the unestablished communication device may be pre-configured to decode the setup and configuration information using a predetermined level of encryption, or may include a limited interface to select a particular level of encryption, without departing from the scope of the present disclosure.

Therefore, in the present exemplary embodiment, an established communication device provides setup and configuration information for accessing a wireless network to an unestablished communication device having limited user interface through the wireless network instead of through the unestablished communication device's user interface. A person or ordinary skill in the art would understand that exemplary embodiments according to the present disclosure may be used to setup and configure multiple unestablished embedded communication devices simultaneously, or unestablished communication devices having a regular user interface, without departing from the scope of the present disclosure. Furthermore, the setup and configuration information may be sent encrypted depending on the security needs of the environment.

Figure 5:
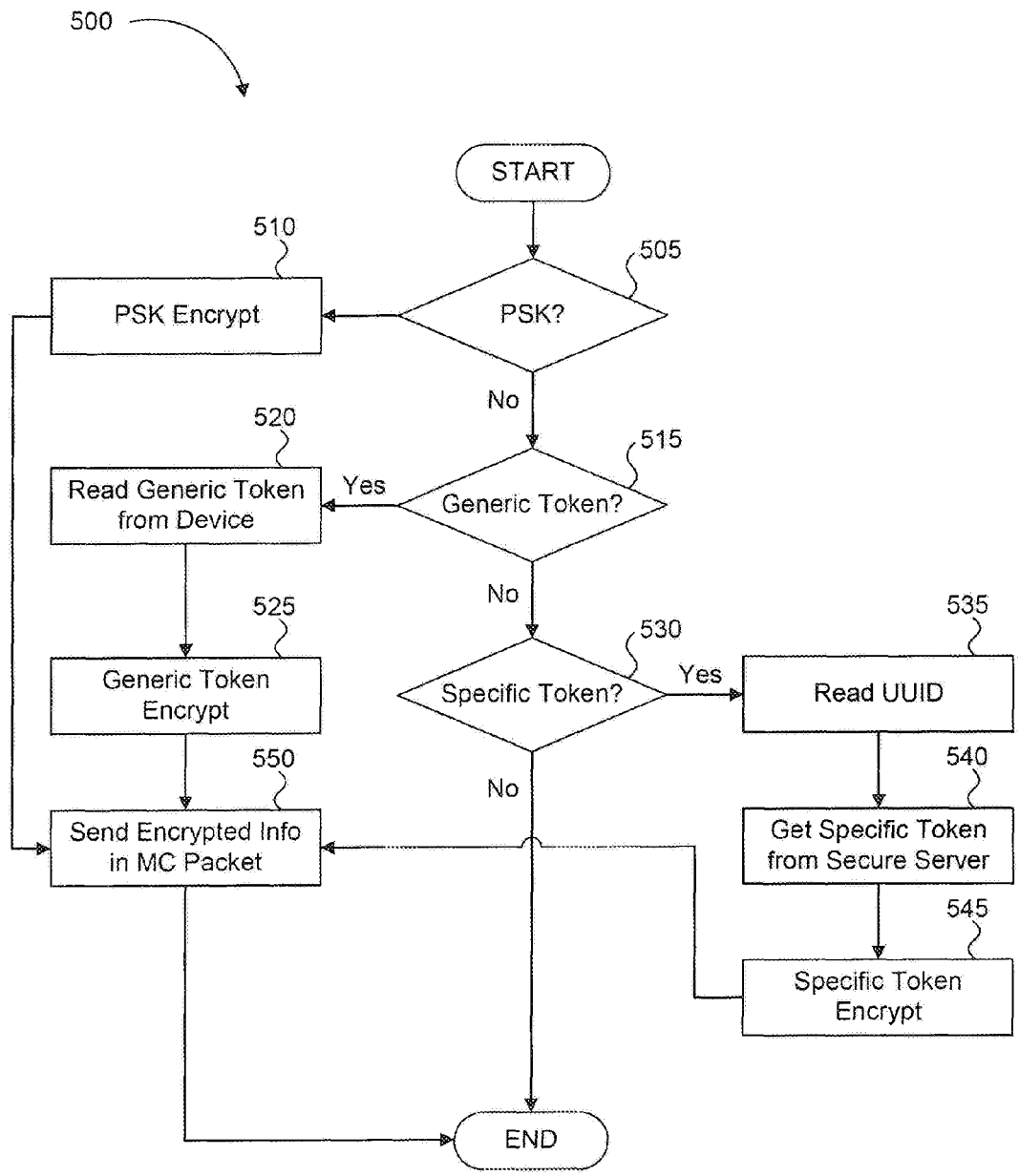
FIG. 5 is a flow diagram of a method for providing setup and configuration information to a device according to an exemplary embodiment.

FIG. 5 is a flow diagram 500 of a method for encrypting the configuration information, according to an exemplary embodiment of the present disclosure. As described above with respect to flow diagrams 300, the established communication device may be configured to perform the method described herein and other methods described throughout the disclosure by downloading and installing a Setup Application. The Setup Application configures the established communication device to receive, through a user interface, a command and/or information to perform the method described in flow diagram 500. For example, the Setup Application may provide the user an input screen to provide information for encrypting setup and configuration information provided to embedded communication devices via one or more multicast packets. Furthermore, flow diagram 500 can further define steps 430 and 435 of flow diagram 400, in which an established communication device has determined that the setup and configuration information for accessing the Wi-Fi network (TX_INFO) needs to be encrypted and performs the encryption.

At step 505, the established communication device determines if TX_INFO needs to be encrypted using a pre-shared key (PSK). A PSK may be set in the embedded communication device during manufacturing or distribution and in the established communication device during manufacturing, distribution, or during installation of a software application for performing aspects of the present disclosure (e.g., a mobile application). The PSK is used by an advanced encryption standard (AES) algorithm to provide additional encryption, so even if an attacker receives the transmission, the information will remain secure as long as the attacker does not have the PSK.

If TX_INFO needs to be encrypted using a PSK, at step 510, the established communication device encrypts TX_INFO with the PSK, using AES or the like, and sends TX_INFO, PSK-encrypted, in a multicast packet to the unestablished embedded communication device through the Wi-Fi network (step 550).

At step 515, the established communication device determines if TX_INFO needs to be encrypted using a generic token. A generic token is one corresponding to, for example, devices made by a particular manufacturer, of the same mode), or used for the same purpose, and may be set in the embedded communication device during manufacturing or distribution. The generic token may be made available to the established communication device via a readable inscription on the embedded communication device, such as an alphanumeric code that a user can read and enter into the established communication device through a user interface. Alternatively, the generic token can be contained in a bar-code, a quick response (QR) code, RFID tag, that is printed on the embedded communication device, or otherwise associated with embedded communication device.

If TX_INFO needs to be encrypted using a generic token, at step 520 the established communication device reads the generic token from a corresponding location (e.g., a QR code) and, at step 525, the established communication device encrypts TX_INFO with the generic token and AES. At step 550, the established communication device sends TX_INFO, encrypted with the generic token, in a multicast packet to the unestablished embedded communication device through the Wi-Fi network.

At step 530, the established communication device determines if TX_INFO needs to be encrypted using a specific token. Contrary to a generic token, a specific token is unique to the particular unestablished communication device. A specific token provides a higher level of security than the generic token because a device listening to the multicast channel would need to know the specific token to retrieve TX_INFO from the channel, which may be more difficult to obtain than a generic token.

A specific token may be set for the embedded communication device during manufacturing or distribution. The established communication device may obtain the specific token by reading/receiving a unique identification from the unestablished communication device, such as a serial number or some other universally unique identifier (UUID), and query a secure server for the specific token. The serial number, UUID, etc. may be made available to the established communication device via a readable inscription on the embedded communication device, such as an alphanumeric code that a user can read and enter into the established communication device through a user interface, a bar-code, a QR code, RFID tag, etc.

If TX_INFO needs to be encrypted using a specific token, at step 535, the established communication device reads the serial number or UUID from, for example, a QR code on the unestablished communication device, and queries the secure server to obtain the specific token.

At step 540, the established communication device encrypts TX_INFO with the specific token and, at step 550, the established communication device sends TX_INFO, encrypted with the specific token and AES, in a multicast packet to the unestablished embedded communication device through the Wi-Fi network.

Therefore, in the present exemplary embodiment, an established communication device provides setup and configuration information for accessing a wireless network to an unestablished communication device having limited user interface through the wireless network instead of through the unestablished communication device's user interface. A person or ordinary skill in the art would understand that exemplary embodiments according to the present disclosure may use encryption algorithms and/or schemes other than those described above to encrypt the setup and configuration information.

Figure 6:
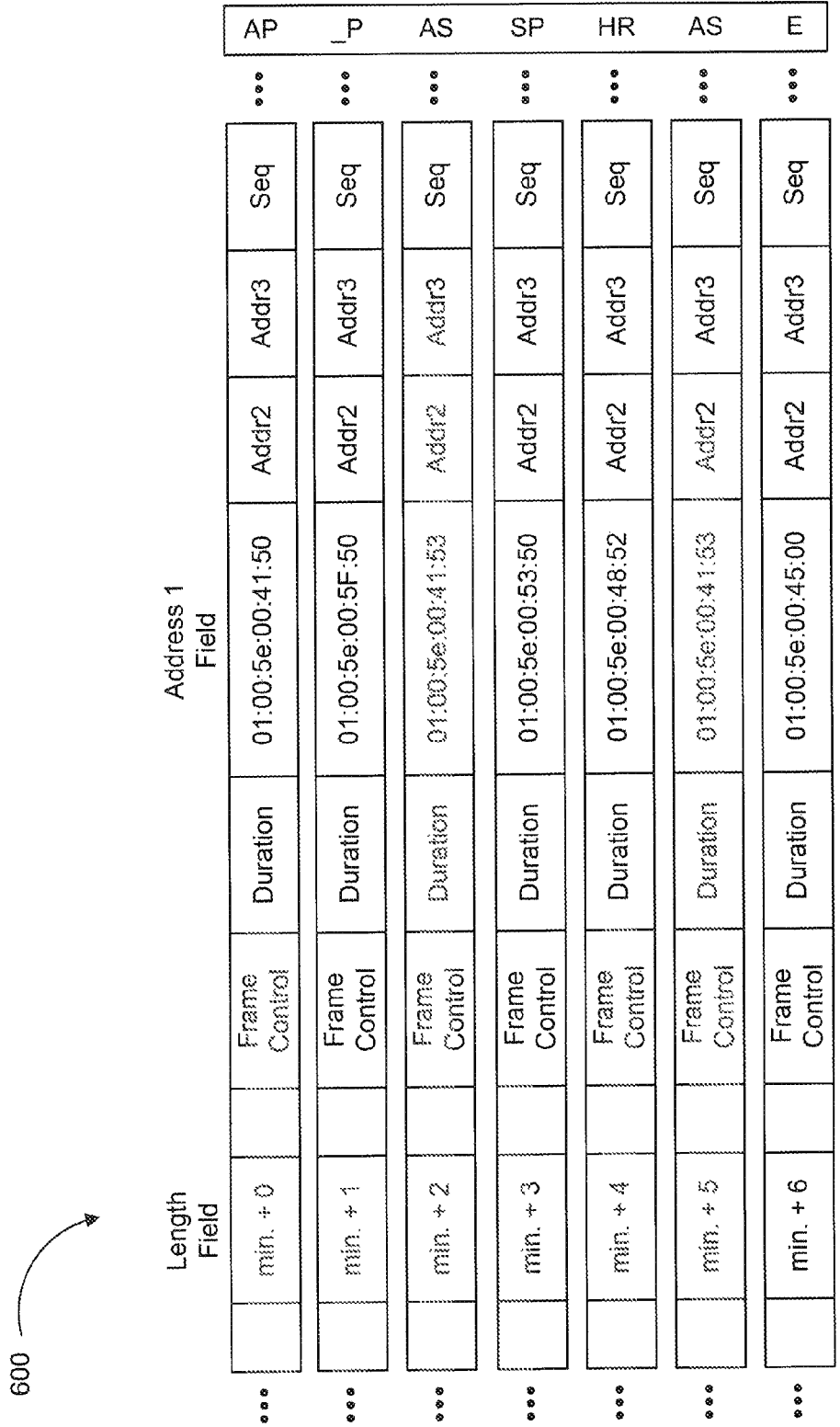
FIG. 6 is a diagram illustrating a plurality of Wi-Fi packets according to an exemplary embodiment.

FIG. 6 illustrates a block of Wi-Fi packets for providing setup and configuration information to unestablished communication devices according to an exemplary embodiment of the present disclosure. As noted above with respect to FIG. 2, the header section of a Wi-Fi packet, and the header section of the Wi-Fi packet's payload, are not encrypted by the wireless network, and therefore can be decoded by devices configured to receive and decode Wi-Fi signals. In various exemplary embodiments of the present disclosure, these unencrypted fields are used to send network setup and configuration information from established communication devices, directly or via a Wi-Fi network, to unestablished embedded communication devices.

In particular, in various exemplary embodiments an established communication device seeking to provide an unestablished communication device with setup and configuration for accessing a Wi-Fi network addresses a plurality of data packets to a multicast address, and sends them to the Wi-Fi network. Unestablished communication devices according to various embodiments can listen for these multicast packets and extract the setup and configuration information as predetermined based on the address. For example, and without limitation, there are a large range of multicast addresses in the Internet Protocol version 4 (IPv4) and Internet Protocol version 4 (IPv6) address space including 239.0.0.0 for IPv4. Some of these multicast addresses are reserved; however, a subset of addresses is generally available, such as addresses in the range 239.0.0.0-239.0.255.255. In one embodiment, the disclosure utilizes one or more of these available multicast addresses for multicast packet transmission. Larger or smaller address ranges may also be available, and other addresses may be used as will be understood by those skilled in the art. Therefore, an established communication device can encode setup and configuration information into a portion of the address field of multicast packets as will be discussed below, and an unestablished communication device can decode the setup and configuration information from the packets.

In an exemplary embodiment, an established communication device can encode and insert an SSID and password for accessing a Wi-Fi network into portions of the address fields in a block of Wi-Fi multicast packets such that the address fields remain within a pre-determined address range. The established communication device can send, either directly or through the Wi-Fi network (e.g. via an access point), the multicast packets. An unestablished communication device according to the present exemplary embodiment can listen for multicast packets and decode the setup and configuration information from multicast packets addressed within the pre-determined address range. The unestablished communication device can then connect to the Wi-Fi network and perform other network tasks, including communicating with the Wi-Fi transmitter client or other network devices.

To increase security and decrease the likelihood of successful eavesdropping, additional bogus packets may be sent by the Wi-Fi transmitter client. The Wi-Fi receiver client can discard the bogus packets once the setup and configuration information is decoded.

Returning to FIG. 6, it illustrates a block of Wi-Fi multicast packet used to send setup and configuration information to one or more unestablished Wi-Fi communication devices according to one embodiment of the present disclosure. The packets are enumerated from 0-6 in the respective length fields for segmentation and reassembly purposes.

In particular, the first packet ending in "0" in the length field can include information that identifies the number of packets in the packet block, so that the receiving unestablished Wi-Fi device is aware of the number of packets that need to be successfully received and reassembled in order to capture the necessary configuration information. As shown, the address field "1" in each packet is used to carry a segment of the setup and configuration information. More specifically, the address field "1" of each packet has a first portion 602 and a second portion 604. The first portion 602 is used for the multicast address (shown as, e.g., 01:00:5e:00) and is repeated in each packet. The second portion 604, which is the remainder of the address field, carries a segment of the setup and configuration information (e.g. "41:50" in the first packet. It is noted that address "1" field is typically used as the destination address or service identification when an access point is sending or re-sending a multi-cast message. However, for purposes herein, the first portion 602 identifies the packet as multicast, and there is no destination or service identification when the packet is being used to communicate the setup and configuration information. Accordingly, the second portion is un-used for a destination address or service identification, and is therefore available to transport setup and configuration information, as described herein.

In the present exemplary embodiment, an established communication device transmits multicast packets 0-6 having the setup and configuration information to an access point, which are then received by the access point and re-transmitted by one or more access points using address "1". An unestablished communication device receives the multicast packet(s) via the access point re-transmission, and thereby retrieves the setup and configuration information. More specifically, the unestablished communication device will recognize a portion of the multicast address (01:00:5e:00) as an indicator of multicast packets that are to be processed by its network stack. The network stack is pre-configured to pull the setup and configuration information from the appropriate portions of the header packet fields.

In addition to sending the setup and configuration information via multicast, the established communication device may also send other information regarding the network, such as its own IP address or that of other devices. Once the unestablished communication device has been configured for the Wi-Fi network, it can send a "hello" message to the transmitting communication device, so as to indicate to the transmitting device that it can stop repeating the multicast transmission with the setup and configuration information, and/or to indicate it is ready for further setup (if required).

In an alienate embodiment, the setup and configuration information is encoded into the length field(s) of Wi-Fi packet headers, or other available or unencrypted portions of the header fields. Further, this disclosure is discussed in terms of Wi-Fi, but is not limited to Wi-Fi, and can be applied to other wireless communications networks, including Zigbee, Bluetooth, and others, as will be understood by those skilled in arts based on the discussion provided herein. Further, the setup and configuration information is not limited to being encoded in multicast packets. Unicast packets could be used, where the length field, or some other header field, is lengthened as necessary to carry the setup and configuration information.

The disclosure is not limited to sending setup and configuration information. For example, the established Wi-Fi communication device can be used to send other information. For example, consider a shop that wants to advertise a sale, information about the sale could be encoded into messages and sent via multicast packets as described above. The multicast packets can be picked up by an application by other mobile phone(s), such as users that are passing by the shop, are therefore notified of the sale.

Figure 7:
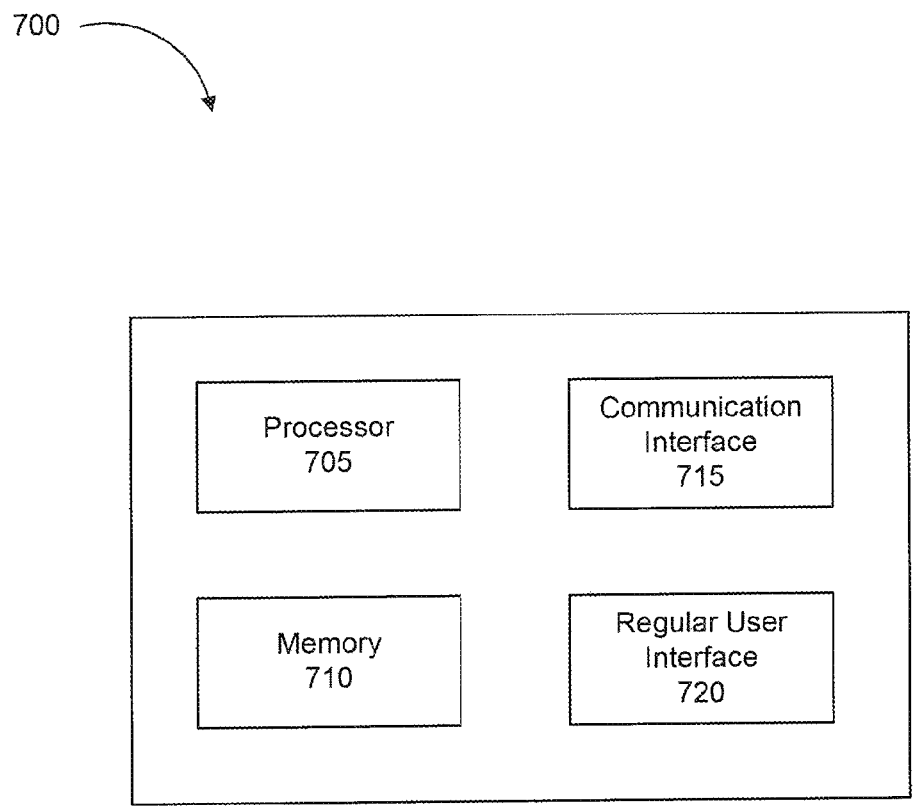
FIG. 7 is a block diagram illustrating a device including a regular user interface according to an exemplary embodiment.

FIG. 7 is a block diagram illustrating a device 700 with a regular user interface according to various embodiments of the present disclosure. Device 700 may be embodied in a laptop computer, a phone, tablet, or some other device having a regular user interface, which is capable of connecting to external networks, such as wireless network 110 illustrated in FIG. 1 and performing operations described herein. Device 700 can be one embodiment of the established communication device 120 discussed herein.

Device 700 includes a processor 705, a memory 710, a communication interface 715, and a regular user interface 720. Processor 705 comprises suitable logic and circuitry to execute code received from memory 710, communication interface 715, or from an internal/local memory, and perform operations associated with the various embodiments described herein, including loading wireless network setup and configuration information into multicast packets. Memory 710 comprises suitable logic and circuitry that may store information that may be utilized and/or that may be generated by processor 705, communication interface 715, and/or regular user interface 720 to perform operations associated with the various embodiments.

Communication interface 715 comprises suitable logic and circuitry to transmit to and receive wireless packets to/from external sources, such as wireless network 110 illustrated in FIG. 1, to perform operations associated with the various embodiments. Although the present disclosure relates to wireless communication, the present disclosure is not so limited, and communication interface 715 may further include suitable logic and circuitry to communicate with external sources via other means, such as the Internet.

Regular user interface 720 comprises suitable logic and circuitry to allow a user to manually enter information associated with the various embodiments, such as setup and configuration information for accessing wireless network 110 illustrated in FIG. 1. A regular interface may include, for example, a keyboard/keypad, a display, a touchscreen display, or any other means that allow the user to easily enter alphanumerical characters, or other representations of network setup and configuration information.

Figure 8:
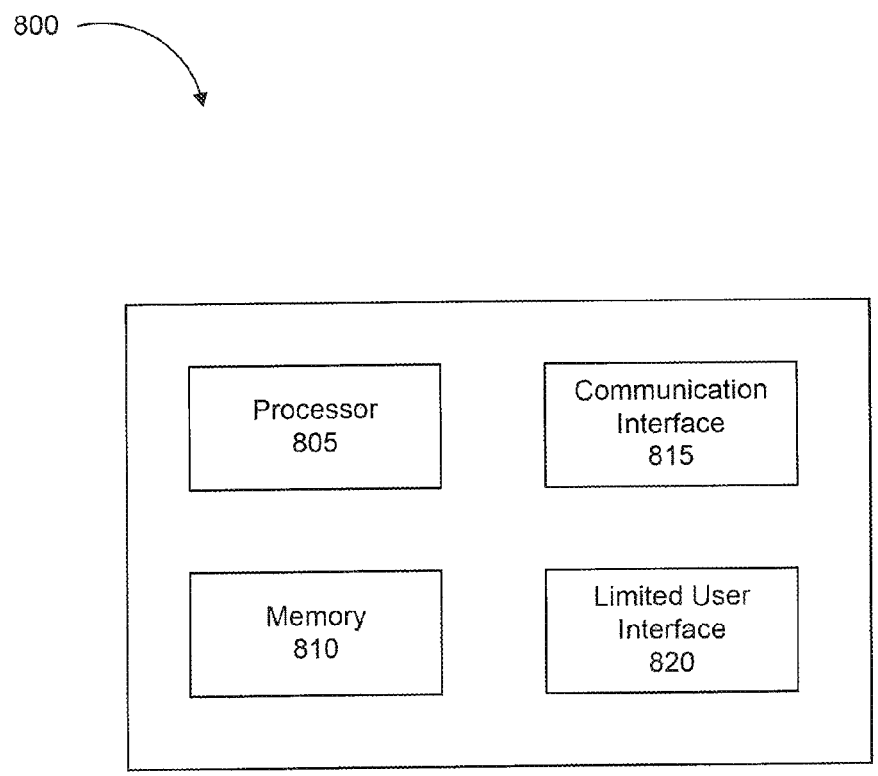
FIG. 8 is a block diagram illustrating a device including a limited user interface according to an exemplary embodiment.

FIG. 8 is a block diagram illustrating a device 800 with a limited user interface according to various embodiments of the present disclosure. Device 800 may be embodied by home appliances (e.g., washer, dryer, dishwasher, oven, small kitchen appliances, etc.), control systems (e.g., thermostat, garage door, home security, etc.), and sensors (e.g., temperature sensors, plant moisture sensors, body weight scales, etc.), that is capable of connecting to external networks, such as wireless network 110 illustrated in FIG. 1 and performing operations described herein. Accordingly, Device 800 can be one embodiment of the unestablished embedded communication device 130 discussed herein.

Device 800 includes a processor 805, a memory 810, a communication interface 815, and a limited user interface 820. Processor 805 comprises suitable logic and circuitry to execute code received from memory 810, communication interface 815, or from an internal/local memory, and perform operations associated with the various embodiments, including retrieving wireless network setup and configuration information from multicast packets received from communications interface 815. Memory 810 comprises suitable logic and circuitry that may store information that may be utilized and/or that may be generated by processor 805, communication interface 815, and/or limited user interface 820 to perform operations associated with the various embodiments discussed herein.

Communication interface 815 comprises suitable logic and circuitry to transmit to and receive from external sources, such as wireless network 110 illustrated in FIG. 1, to perform operations associated with the various embodiments. Although the present disclosure relates to wireless communication, the present disclosure is not so limited, and communication interface 815 may further include suitable logic and circuitry to communicate with external sources via other means, such as the Internet.

Limited user interface 820 comprises suitable logic and circuitry to allow a user to interact with device 800 according to the various embodiments, such as allowing a user to enable device 800 to listen for setup and configuration information to access a wireless network, such as wireless network 110 illustrated in FIG. 1. A limited interface may include, for example, switch, a press-button, a numeric keypad, and/or a small display.

CONCLUSION

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to be limiting.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The Detailed Description of the exemplary embodiments has revealed the general nature of the present disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A method to distribute network configuration information over a wireless network to a non-client device, comprising:
   determining, by a network client device, the network configuration information:
   receiving, by the network client device, a universally unique identification (UUID) of the non-client device;
   querying, by the network client device, a server based on the UUID;
   receiving, by the network client device in response to the query, a token associated with the non-client device;
   generating, by the network client device, a data packet having the network configuration information, wherein the generating includes,
      forming the data packet to have a multicast address and a payload,
      encrypting the network configuration information using an advanced encryption standard based on the token, and
      loading the encrypted network configuration information in an unused portion of the multicast address of the data packet that is not needed for communication of the data packet over the wireless network; and
   transmitting the data packet having the encrypted network configuration information over the wireless network in a multicast manner using the multicast address.

2. The method of claim 1, wherein the network configuration information includes at least a portion of an identification of the wireless network and a password for accessing the wireless network.

3. The method of claim 1, wherein the data packet further includes at least a portion of an Internet Protocol address of the network client device.

4. The method of claim 1, wherein:
   the wireless network is a Wi-Fi network;
   the network configuration information comprises at least a portion of a service set identification (SSID) and a password of the Wi-Fi network.

5. The method of claim 4, further comprising:
   receiving the data packet at an access point of the Wi-Fi network;
   identifying the multicast address; and
   rebroadcasting the data packet from the access point over the Wi-Fi network.

6. A communication device, comprising:
   a communication interface, including circuitry, configured to communicate over a wireless network; and
   a processor coupled to a memory, the memory storing instructions that cause the processor to:
      establish communication with the wireless network using network configuration information;
      generate a data packet having a multicast address and a payload, wherein the network configuration information is loaded in an unused portion of the multicast address of the data packet that is not needed for communication of the data packet over the wireless network, and
      cause the data packet to be transmitted by the communication interface over the wireless network in a multicast manner using the multicast address,
   wherein the wireless network is a Wi-Fi network, and wherein the instructions cause the processor to form the multicast address to be recognized by the Wi-Fi network and include at least a portion of a service set identification (SSID) and a password needed to access the Wi-Fi network as the network conformation in the unused portion of the multicast address.

7. The communication device of claim 6, wherein the processor, based on the instructions, is configured to insert at least a portion of an Internet Protocol address associated with the communication device in the data packet.

8. The communication device of claim 6, wherein the processor, based on the instructions, is configured to:
   encrypt the network configuration information for accessing the wireless network based on the established communication using an advanced encryption standard based on a pre-shared key (PSK) that is shared with a device that is not a current client of the wireless network.

9. The communication device of claim 6, further comprising:
   a user interface configured to receive a universally unique identification (UUID) of a device that is not a current client of the wireless network,
   wherein the processor, based on the instructions, is configured to:
   query a server based on the UUID,
   receive, in response to the query, a token associated with the device that is not a current client of the network: and
   encrypt the network configuration information using an advanced encryption standard based on the token.

10. The communication device of claim 6, wherein the data packet is one of a plurality of data packets having at least a portion of the SSID or password needed to access the Wi-Fi network, and wherein the data packet includes an indication of the number of the plurality of data packets that collectively transport the SSID or password needed to access the Wi-Fi network.

11. A communication device, comprising:
   a communication interface, including circuitry, configured to communicate over a wireless network; and
   a processor coupled to a memory, the memo storing instructions that cause the processor to:
      establish communication with the wireless network using network configuration information;
      generate a data packet having a multicast address and a payload, wherein the network configuration information is loaded in an unused portion of the multicast address of the data packet that is not needed for communication of the data packet over the wireless network, and
      cause the data packet to be transmitted by the communication interface over the wireless network in a multicast manner using the multicast address,
   wherein the processor, based on the instructions, is configured to encrypt an identification of the wireless network, a password for accessing the wireless network, and an Internet Protocol address of the communication device, at least portions of which are included in the unused portion of the multicast address of the data packet.

12. The communication device of claim 11, further comprising:
   a user interface configured to receive a universally unique identification (UUID) of a device that is not a current client of the network, wherein the processor, based on the instructions, is configured to
query a server based on the UUID; and
receive, in response to the query, a token associated with device that is not a current client of the network.

13. The communication device of claim 12, wherein the processor, based on the instructions, is further configured to:
encrypt the network identification using an advanced encryption standard based on the token.

14. The communication device of claim 12, wherein the processor, based on the instructions, is further configured to:
encrypt the password using an advanced encryption standard based on the token.

15. The communication device of claim 12, wherein the processor, based on the instructions, is further configured to:
encrypt the Internet Protocol address using an advanced encryption standard based on the token.

16. A method to receive network configuration information for a wireless network, comprising:
receiving, by a device that is not a current client of the network, data packets having a multicast address that are multicast by the wireless network and an Internet Protocol address of a network client device that originated the data packets;
decoding the network configuration information from unused portions of the multicast address of the data packets that are not needed for communication of the data packets over the wireless network;
registering with the wireless network using the network configuration information; and
transmitting a message to the network client device using the Internet Protocol address to confirm the registration with wireless network.

17. The method of claim 16, further comprising:
decrypting the network configuration information based on a pre-stored decryption key.

18. The method of claim 16, wherein a first data packet of the data packets includes an indication of the number of data packets that transport the network configuration information.

* * * * *